(No Model.)  3 Sheets—Sheet 2.

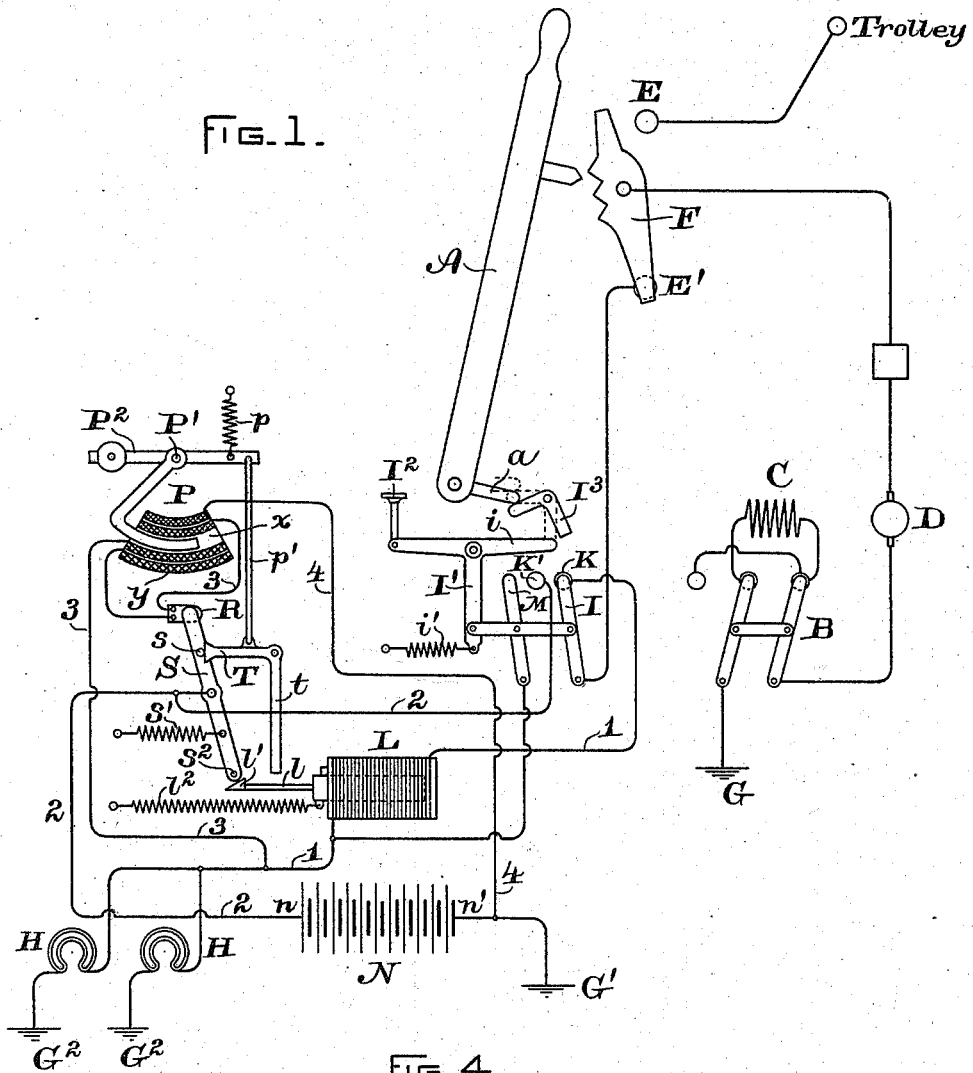
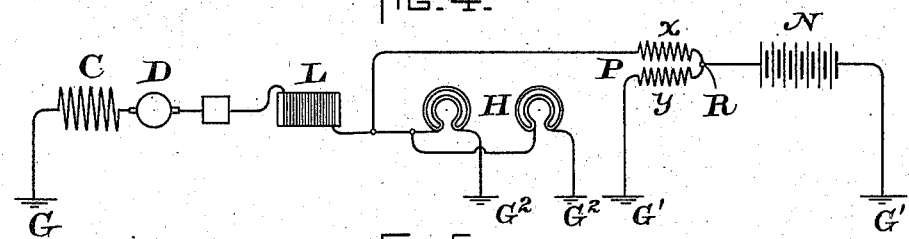
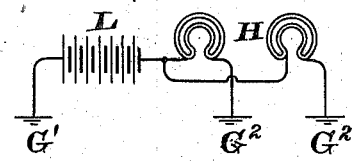

E. A. SPERRY.
ELECTRIC CAR BRAKE.

No. 574,120. Patented Dec. 29, 1896.

WITNESSES.
A.H. Abell.
A.F. Macdonald.

INVENTOR.
Elmer A. Sperry
by
Geo. R. Blodgett,
atty.

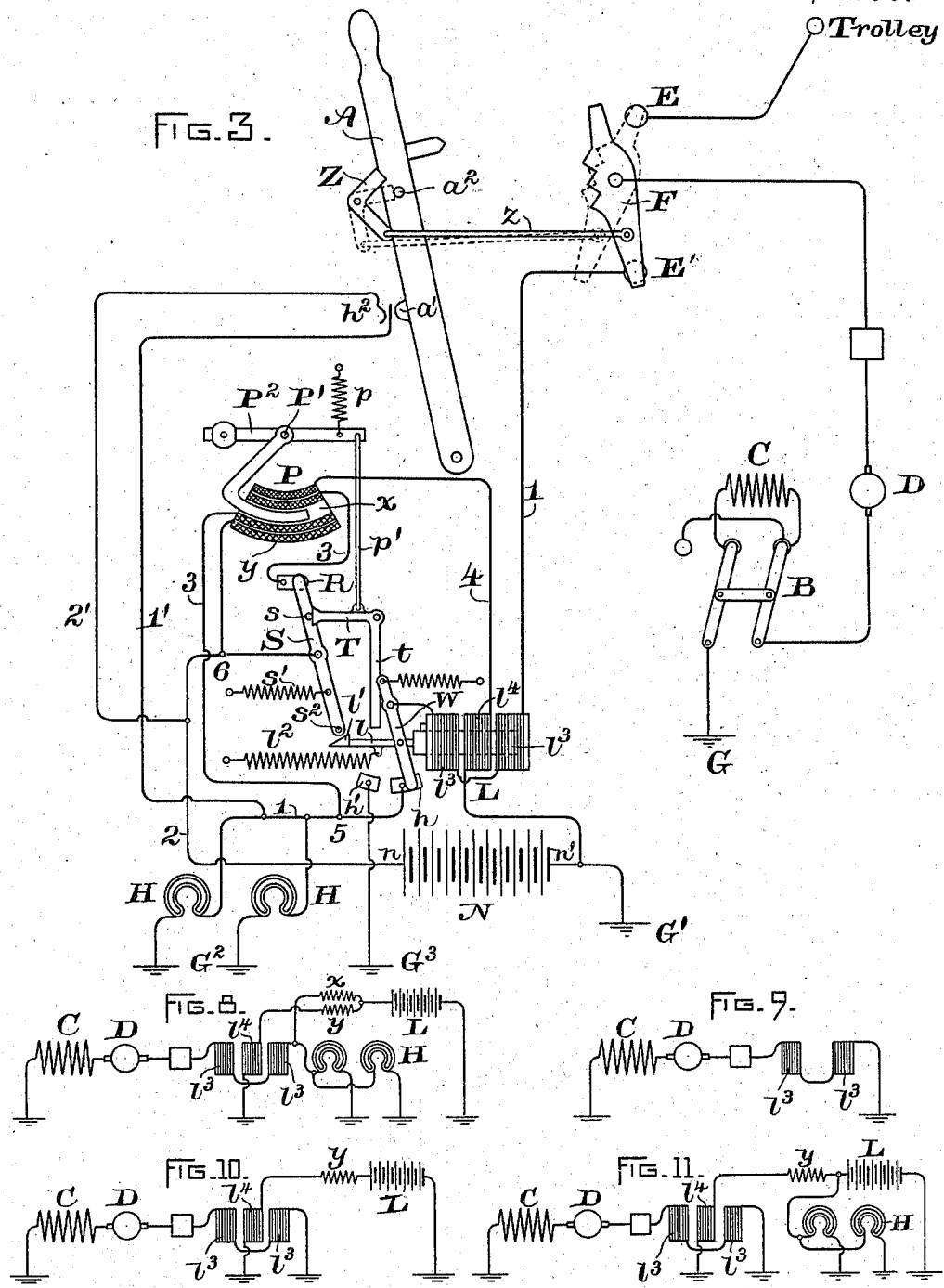

UNITED STATES PATENT OFFICE.

ELMER A. SPERRY, OF CLEVELAND, OHIO, ASSIGNOR TO THE GENERAL ELECTRIC COMPANY, OF NEW YORK.

ELECTRIC CAR-BRAKE.

SPECIFICATION forming part of Letters Patent No. 574,120, dated December 29, 1896.

Application filed June 26, 1896. Serial No. 597,042. (No model.)

*To all whom it may concern:*

Be it known that I, ELMER A. SPERRY, a citizen of the United States, residing at Cleveland, in the county of Cuyahoga, State of Ohio, have invented certain new and useful Improvements in Electric Car-Brakes, (Case No. 325,) of which the following is a specification.

My invention relates to electric-railway cars in which the motor or motors used for propelling the vehicles are converted into generators for supplying current to electric braking apparatus when it is desired to stop the vehicle.

The object of the present invention is to provide means for supplying power to hold the car stationary after it has come to a full stop and the motors have ceased to generate current.

To this end my invention consists in an electric brake of the kind referred to provided with an auxiliary source of electric energy, such as a storage battery, with circuit connections for supplying said battery with current when the brakes are being energized and for automatically opening the circuit between the battery and the generator when the potential of the current drops below a predetermined point. If the car has come to a full stop and it is desired to keep the brake on, for instance, to hold the car on a grade, the brake-circuit is connected with the battery or other auxiliary source of power. It is not necessary to supply very much power to the brakes for holding the car still, since only a slight frictional resistance between the brake-shoes and the wheels is sufficient to prevent the car from starting even on a heavy grade. The connection of the brakes with the auxiliary source of energy may be made by hand.

In the accompanying drawings, Figure 1 is a diagrammatic view of the apparatus with the brakes receiving current from the motors working as generators. Figs. 2 and 3 are modifications. Figs. 4 to 11 are diagrams of electrical connections.

For changing the motor connections, so as to cause them to supply current to the brake mechanism, I may use any suitable controller, such, for instance, as the one shown in my Patent No. 535,511, dated March 12, 1895.

The lever or actuator of this device is indicated at A, Fig. 1, the reversing-switch for changing the relative field and armature connections being shown at B, C being the field-coil and D the armature of the motor. The trolley is in circuit with the contact-plate E, which can be connected with one terminal of the motor by the switch-lever F. The other terminal of the motor is connected through the reversing-switch B to ground at G.

The brake-magnets are indicated at H, and in Fig. 1 these are in circuit with the motor, the trolley connection being broken and the motor working as a generator, with the switch-lever F closed upon the contact-plate E'. In circuit between the plate and the brake-magnets is a switch I, a contact-plate K, and a solenoid L. The switch is actuated by an elbow-lever I', having a plunger $I^2$. An arm $i$ on the lever is normally engaged by a movable stop $I^3$, which is pushed to one side to release the lever I' when the actuator A is thrown to the extreme right, as shown in Fig. 1, the actuator having a finger $a$ to strike against the stop $I^3$. A second switch-lever M is arranged to be actuated by the elbow-lever I' simultaneously with the switch I, the switch M making contact with a plate K' when the switch I is open, and vice versa. The switch M is connected around the solenoid L with the conductor 1, which is connected with the brake-magnets.

The plate K' is connected by conductor 2 with one terminal $n$ of a storage battery N, the other terminal $n'$ being grounded at G'. It will be seen that by means of the elbow-lever I' the circuit from the motors to the brakes can be broken and that from the battery to the brakes closed, the brake-magnets having one terminal grounded at $G^2$. When the car stops and the motor ceases to supply current to the brakes, the battery can thus be thrown into circuit to furnish current enough to hold the brakes on. (See Fig. 5.) A spring $i'$ restores the switch-levers I' M to the position shown in Fig. 1 when the plunger $I^2$ is released.

In order that the battery N may be charged by the motors when they are energizing the brake-magnets, a shunt-conductor 3 is run from the main conductor 1 to connect with conductor 2, running to the terminal $n$ of the battery, a suitable circuit-breaker being interposed in the circuit. This is preferably such as I have shown in Fig. 1. A solenoid P is wound differentially, the current passing first through one coil $x$ to the contact-plate R, and thence passing through the other coil $y$ and by conductor 4 to the terminal $n'$ of the battery and to ground G'. The current divides at the plate R, part of it going by the switch S and conductor 2 to the terminal $n$ of the battery. The core of the solenoid P is mounted on an arm on a rock-shaft P', which carries a counterweighted arm $P^2$, to which is attached a spring $p$ to yieldingly hold the core in its normal position. A link $p'$ connects the arm $P^2$ with a pivoted detent T, which engages a pin $s$ on the switch S and holds said switch closed upon the contact-plate R so long as the two coils $x$ and $y$ on the solenoid are balanced in strength.

The main solenoid L has a core provided with a rod $l$, having a hook $l'$ at its end. A spring $l^2$ retracts the core when the solenoid ceases to attract it. The operation of this device is as follows: When the electromotive force of the armature drops below that of the battery, the latter would tend to feed current to the motor, so that it is necessary to interrupt the circuit. This is accomplished by the battery-current flowing up to the switch S, the plate R, and the second coil $y$ in the solenoid P to ground. The current in the coils being now unequal, owing to the drop in the armature-current, the battery-current energizes the solenoid and attracts its core, lifting the detent T and releasing the switch S, which is pulled by the spring $s'$ away from the plate R, thus breaking the battery-charging circuit. When the armature-current fails, the spring $l^2$ draws out the core of the main solenoid L, so that the hook $l'$ will engage with a pin $s^2$ in the end of the switch S and be ready to return it to the position shown as soon as the armature-current again flows through this, resetting solenoid L. If for any reason the solenoid P fails to break the battery-circuit, the core of the solenoid L will strike the lower end of an arm $t$, projecting from the detent T, and force it out of engagement with the switch S and allow the spring $s'$ to open the circuit, as before.

It will be noticed that after the battery-charging circuit is broken at the plate R the main or motor circuit still remains closed not only through the brake-magnets, but also through the two solenoids P, as shown in diagram, Fig. 4.

Fig. 2 shows a modification in which the circuit from the trolley to the contact-plate E includes a solenoid U, the core of which is arranged to operate a circuit-breaker in the conductor 4, as, for instance, by being attached to one of a pair of separable contact-plates V. Then when the lever F is thrown to cut out the brake-magnets and connect the motors with the trolley the solenoid U breaks the high-resistance shunt around the storage battery. This is simply a measure of economy to prevent the battery from discharging while the motors are propelling the car, the switch S remaining open until the motors are once more connected up as generators and the resetting-solenoid L energized to close said switch by means of the hook $l'$.

Figure 2:
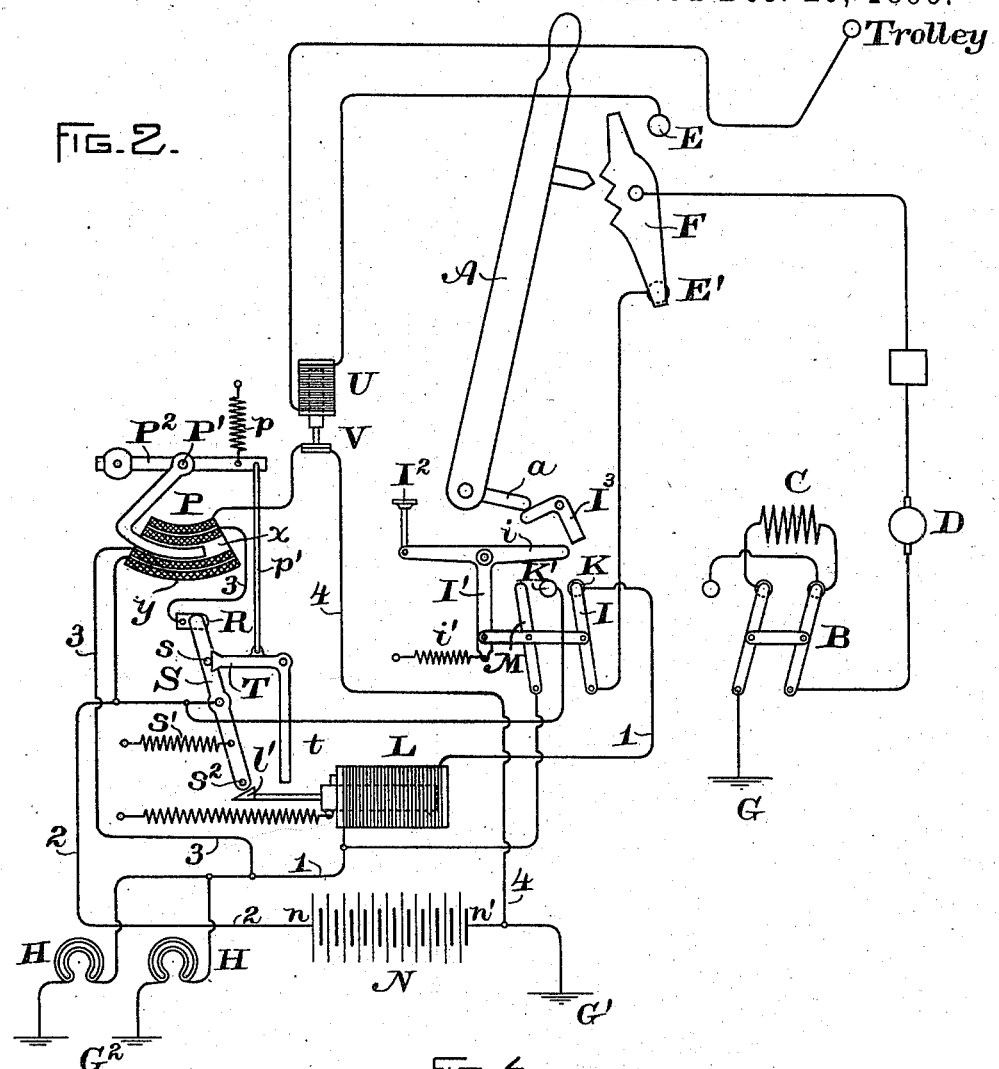
Figure 6:
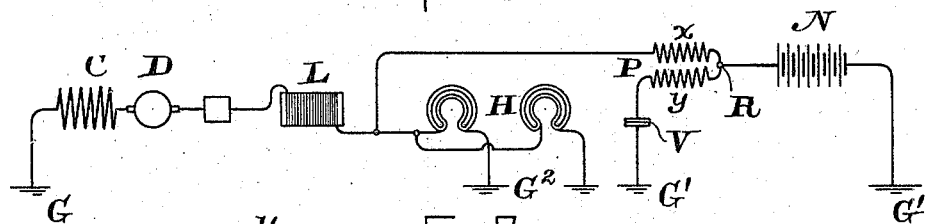
Fig. 6 shows the circuits when the device represented in Fig. 2 is set for energizing the brake-magnets and changing the battery.
Figure 7:
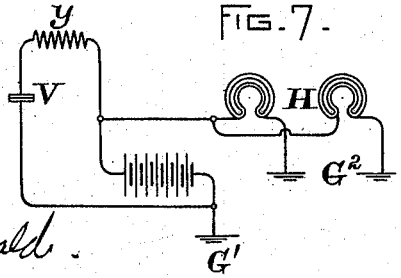
Fig. 7 shows the circuit when the battery is energizing the brake-magnets, the switch S being open.

In Fig. 3 I have shown another modification, in which the switch-levers I and M and the elbow-lever I' are omitted, the plate E' being in direct connection with one or more coils $l^3$ of the solenoid L, composed of fine wire. The rod $l$, attached to the core of the solenoid, is hinged to a switch-lever W, with which the coils $l^3$ are connected. The lever rests on a contact-plate $h$ in circuit with the brake-magnets H during the operation of braking and charging the battery; but when the armature-current falls below the predetermined minimum and the core of the solenoid L is drawn out by the spring $l^2$ the lever W is shifted to contact-plate $h'$, which is grounded at $G^3$. This maintains the circuit of the motors, so that they continue to generate current and then effect something of a braking action so long as the car remains in motion. (See Fig. 9.) With the lever W on plate $h$ the armature-current divides at the point 5, part going to the brake-magnets H and part to the coil $x$ of the differential solenoid P, thence to pltae R and switch-lever S to the point 6, where it again divides, part going to the terminal $n$ of the battery N and the rest to coil $y$ of the solenoid P, thence by conductor 4 to the coil $l^4$ of coarse wire in the solenoid L, and thence to ground at G'. This is shown more clearly in the diagram, Fig. 8.

When the armature-current fails and the brake-magnet is cut out of the armature-circuit by the lever W, the battery-current, overcoming the charging-current, flow one part up through coils $y$ and $l^4$ to ground and the other part through coil $x$ to the brake-magnets and to ground; but the former being the stronger the coil $y$ acts upon the core of the solenoid P and trips the switch-lever S, allowing it to open and break the circuit through the magnets H. (See Fig. 10.)

If now it is desired to energize the brakes, it can be done by moving the actuator A to the left, while its button $a'$ closes the contact-springs $h^2$ between the conductors 2' 1', thus connecting the terminal $n$ of the battery with the brake-magnets, shunting the high-resistance coil $y$ and the coil $l^4$. (See Fig. 11.)

When the lever F is thrown to cut out the braking connections and cut in the trolley, a rod $z$, pivoted to the lever F, turns down a stop Z into the path of a pin $a^2$ on the actuator A, and prevents it from being moved far enough to close the springs $h^2$. This prevents the battery from being used to set the brakes when the car is running.

It will be observed that the high-resistance solenoid P is an automatic current-standard, against which the gradually-decreasing current from the armature measures itself as the car slows down, and when a certain potential relation obtains between the armature-current and the battery-current the solenoid trips the switch S, which cuts out the battery, in order to prevent it from discharging.

When the car has come to a standstill and the armature-current has ceased, the friction between the brake-shoes and the wheels, which has been created by the effect of the armature-current, can be maintained by the battery-current by closing the circuit between the battery and the brake-magnets. A very small expenditure of current will hold the car at rest even on a downgrade.

What I claim as new, and desire to secure by Letters Patent of the United States, is—

1. In an electric car-brake, the combination with brake-magnets, of a storage-battery, circuit connections for supplying the magnets and the battery with current from the motor, means for automatically cutting out the battery when the armature-current falls below a predetermined potential, and means for connecting the battery with the brake-magnets, as set forth.

2. In an electric brake, the combination with brake-magnets, of a storage battery, circuit connections for supplying the magnets and the battery with current from the motor, a shunt around the battery, a high-resistance solenoid in said shunt, and devices controlled by said solenoid for breaking the battery-charging circuit, as set forth.

3. In an electric brake, the combination with brake-magnets, of a storage battery, circuit connections for supplying the magnets and the battery with current from the motor, a self-opening circuit-breaker controlling a battery-charging circuit, a shunt around the battery, and a high-resistance solenoid in said shunt controlling a circuit-breaker, as set forth.

4. In an electric brake, the combination with a brake-magnet, of a storage battery, circuit connections for supplying said magnet and the battery with current from the motor, a self-opening circuit-breaker controlling the battery-charging circuit, a shunt around the battery, a solenoid in said shunt controlling said circuit-breaker, and a resetting-solenoid in the motor-circuit, as set forth.

5. In an electric brake, the combination with brake-magnets, of a storage battery, circuit connections for supplying said magnets and battery with current from the motor, a shunt around the battery, a differentially-wound solenoid having one of its coils in said shunt, and a circuit-breaker in the battery-charging circuit controlled by said solenoid, as set forth.

6. In an electric brake, the combination with brake-magnets, of a storage battery, circuit connections for supplying the current to said magnets and the battery from the motor, a circuit-breaker in the battery-charging circuit, a shunt around the battery, a differentially-wound solenoid having one of its coils in said shunt and the other between the motor and the circuit-breaker, and a tripping device for the circuit-breaker actuated by said solenoid, as set forth.

7. In an electric brake, the combination with brake-magnets, of a storage battery, circuit connections for supplying said magnets and battery with current from the motor, a shunt around the battery, a solenoid in said shunt controlling the battery-charging circuit, and means for automatically opening said shunt when the motor is connected with the trolley, as set forth.

In witness whereof I have hereunto set my hand this 18th day of June, 1896.

ELMER A. SPERRY.

Witnesses:
L. LEWIS,
ARTHUR P. YOUNG.